US012340736B2

(12) United States Patent
Posat et al.

(10) Patent No.: US 12,340,736 B2
(45) Date of Patent: Jun. 24, 2025

(54) SYSTEMS AND METHODS FOR IR-INDEPENDENT PRE-CHARGE AND INVERTER- BASED IR REDUCTION

(71) Applicant: Apple Inc., Cupertino, CA (US)

(72) Inventors: Baris Posat, Saratoga, CA (US); Rajesh Velayuthan, Pleasanton, CA (US); Hooman Torabi Parizi, Palo Alto, CA (US); Young Don Bae, San Jose, CA (US); Hasan Akyol, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/618,916

(22) Filed: Mar. 27, 2024

(65) Prior Publication Data

US 2025/0078731 A1 Mar. 6, 2025

Related U.S. Application Data

(60) Provisional application No. 63/536,878, filed on Sep. 6, 2023.

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2330/021* (2013.01)

(58) Field of Classification Search
CPC ............. G09G 3/32; G09G 2300/0819; G09G 2300/0842; G09G 2330/021
See application file for complete search history.

(56) References Cited

U.S. PATENT DOCUMENTS

| | | | | |
|---|---|---|---|---|
| 5,859,632 A * | 1/1999 | Ito | G09G 3/3696 345/95 |
| 7,400,098 B2 | 7/2008 | Ng | |
| 7,437,252 B2 * | 10/2008 | Sutardja | H03H 11/30 365/194 |
| 8,259,043 B2 | 9/2012 | Schmidt | |
| 8,717,345 B2 | 5/2014 | Bae | |
| 10,175,830 B2 | 1/2019 | Syed | |
| 10,217,423 B2 | 2/2019 | Wang | |
| 10,762,836 B1 * | 9/2020 | Bae | G09G 3/3233 |
| 11,114,011 B1 | 9/2021 | Chang | |
| 11,263,963 B2 | 3/2022 | Shaeffer | |
| 2008/0284771 A1 | 11/2008 | Matsuki | |
| 2014/0347946 A1 * | 11/2014 | Plavec | G11C 5/147 323/234 |

(Continued)

*Primary Examiner* — Benjamin C Lee
*Assistant Examiner* — Nathan P Brittingham
(74) *Attorney, Agent, or Firm* — Fletcher Yoder, P.C.

(57) ABSTRACT

In an embodiment, an electronic display may include an electronic display panel that includes a plurality of display pixels configured to emit light; a first pre-charge voltage source; and a second pre-charge voltage source; and a microdriver that may include: a capacitor coupled at a first terminal to the first pre-charge voltage source and coupled at a second terminal to the second pre-charge voltage source; and a buffer. The buffer may include a positive input terminal coupled to the first pre-charge voltage source and the capacitor; an output terminal coupled to a plurality of driving circuits; and a negative input terminal coupled to the output terminal.

20 Claims, 10 Drawing Sheets

(56) References Cited

U.S. PATENT DOCUMENTS

| | | | | |
|---|---|---|---|---|
| 2018/0122310 | A1* | 5/2018 | Wang ................ | G02F 1/136286 |
| 2023/0086380 | A1 | 3/2023 | Charisoulis | |
| 2023/0089957 | A1 | 3/2023 | Charisoulis | |
| 2023/0091644 | A1 | 3/2023 | Charisoulis | |

* cited by examiner

SYSTEMS AND METHODS FOR IR-INDEPENDENT PRE-CHARGE AND INVERTER- BASED IR REDUCTION

CROSS-REFERENCE TO RELATED APPLICATIONS

This application claims priority to U.S. Provisional Application No. 63/536,878, filed Sep. 6, 2023, which is incorporated by reference herein in its entirety for all purposes.

SUMMARY

This disclosure relates to systems and methods for improving electronic display performance by mitigating and reducing IR drop across the electronic display.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (uLEDs). By causing different display pixels to emit different amounts of light, individual display pixels of an electronic display may collectively produce images.

Pulsed electronic displays use local passive matrices (LPMs) of display pixels that are pulsed when driven by microdriver circuitry specific to each LPM. By adjusting the amount of time each display pixel is pulsed, different display pixels may emit different amounts of light, allowing the display pixels on the electronic display to collectively represent an image. Light emitting diodes (LEDs) of the display pixels may not emit light until they have been charged to a particular threshold voltage level.

As such, the display pixels may be pre-charged to an initial voltage before the display pixels are provided an emission current, thereby causing the display pixels to begin to emit light as soon as the emission current is provided. As display panels grow larger, pre-charging display pixels that are farther away from a voltage source may result in a greater amount of voltage drop below or voltage rise above a desired voltage, known as current-resistance (IR) error, at the display pixels than pre-charging display pixels that are closer to the voltage source. This may result in a loss of uniformity of the display pixels due to varying levels of IR error at different display pixels.

Additionally, some electronic displays may user non-inverting buffers to transmit data from microdriver-to-microdriver. However, the use of non-inverting buffers may cause IR error to accumulate on only one voltage source, even when a circuit utilizes two voltage sources (e.g., a positive voltage source (VDD) and a negative voltage source (VSS)). This may increase IR error across the display and may increase peak panel current, which may cause excessive power to be consumed. The IR error may include an IR drop or an IR rise above a target or desired IR (voltage) level.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
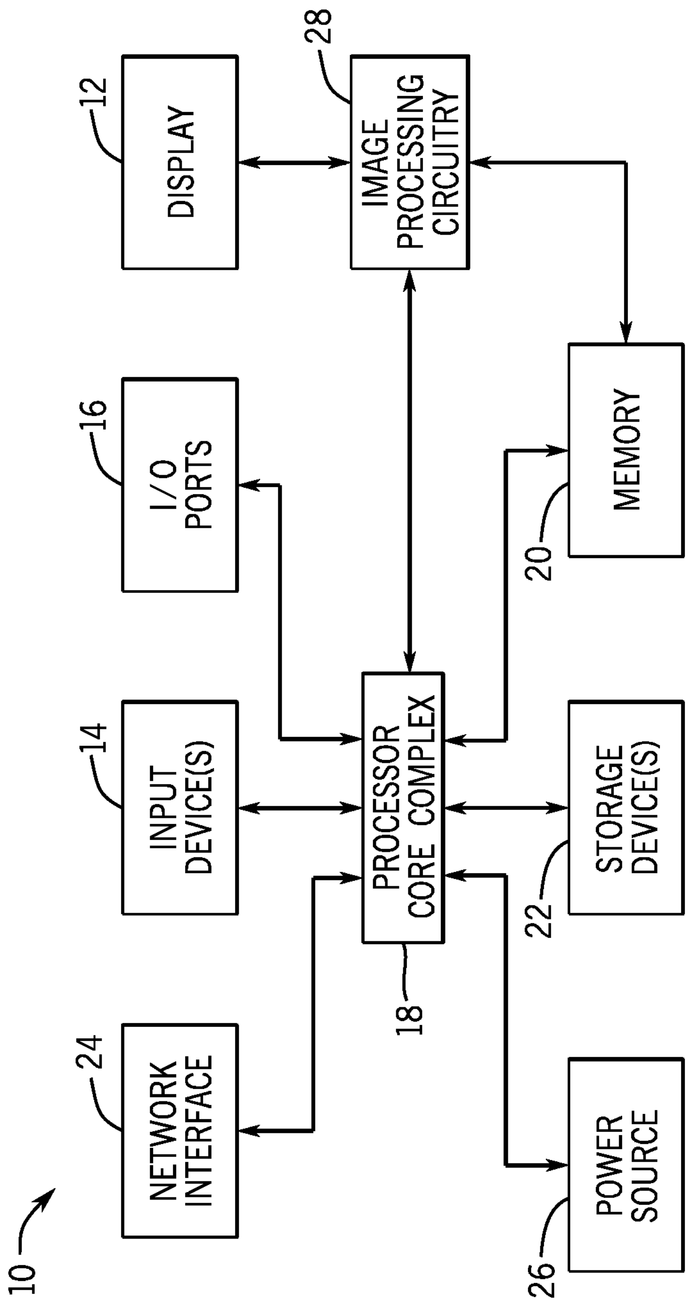
FIG. 1 is a block diagram of an electronic device that includes an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Pulsed electronic displays use local passive matrices (LPMs) of display pixels that are pulsed when driven by microdriver circuitry specific to each LPM. By adjusting the amount of time each display pixel is pulsed, different display pixels may emit different amounts of light, allowing the display pixels on the electronic display to collectively represent an image. Light emitting diodes (LEDs) of the display pixels may not emit light until they have been charged to a particular threshold voltage level.

As such, the display pixels may be pre-charged to an initial voltage before the display pixels are provided an emission current, thereby causing the display pixels to begin to emit light as soon as the emission current is provided. As display panels grow larger, pre-charging display pixels that are farther away from a voltage source may result in a greater amount of voltage error, known as current-resistance (IR) error, at the display pixels than pre-charging display pixels that are closer to the voltage source. This may result in a loss of uniformity of the display pixels due to varying levels of IR error at different display pixels. The IR error may include an IR drop or an IR rise.

To address the IR error due to display pixel pre-charging, an analog buffer and sampling capacitor may be used to provide a pre-charge voltage that is equal to the difference of two IR-independent reference voltages. This may enable uniform pre-charge voltage across even a large display panel. Moreover, to reduce static power consumption, the analog buffer may be enabled only during a very short pre-charge duration and disabled all other times.

Moreover, as the use of non-inverting buffers may cause IR drop to accumulate on only one voltage source, to reduce IR drop across the electronic display, an electronic display may be implemented with inverters. The inverters may evenly distribute IR drop over the positive and negative voltage sources. For example, adjacent microdrivers may use alternating inverters to distribute IR drop between VDD and VSS. Moreover, when one of the voltage sources has reduced IR drop, this may improve the total headroom of the electronic display. Furthermore, because toggling between polarities results in a small staggering, this may also distribute IR drop over time, further reducing the instantaneous IR drop across the electronic display and decreasing maximum peak current across the electronic display.

With the foregoing in mind, FIG. 1 is an example electronic device 10 with an electronic display 12 having independently controlled color component illuminators (e.g., projectors, backlights, etc.). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a BLUETOOTH® network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch-sensing components that enable user inputs to the electronic device 10 by detecting the occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). Although sometimes used to refer to a collection of sub-pixels (e.g., red, green, and blue subpixels) as used herein, the terms display pixel or pixel may refer to an individual sub-pixel (e.g., red, green, or blue subpixel).

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
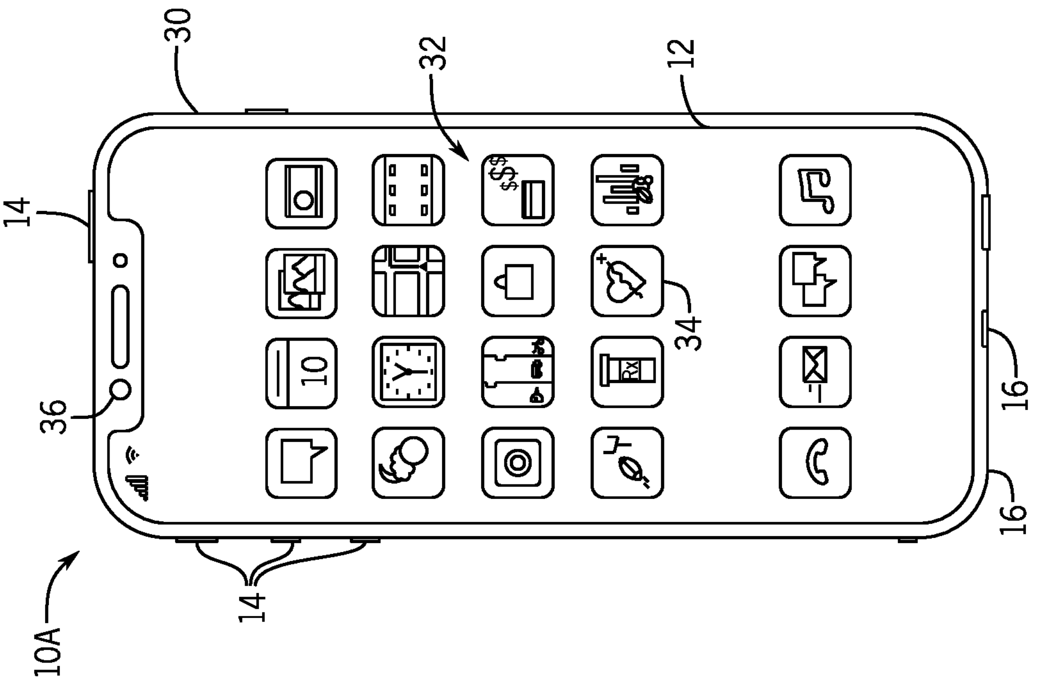
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
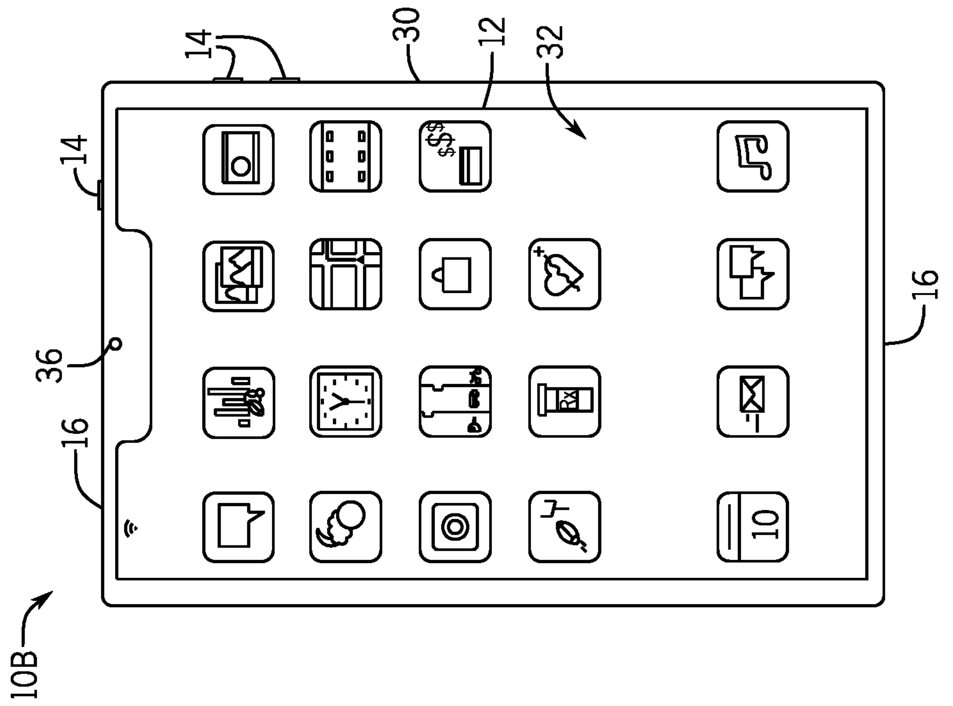
FIG. 3 is another example of the electronic device of FIG. 1 in the form of a tablet device, in accordance with an embodiment.
Figure 4:
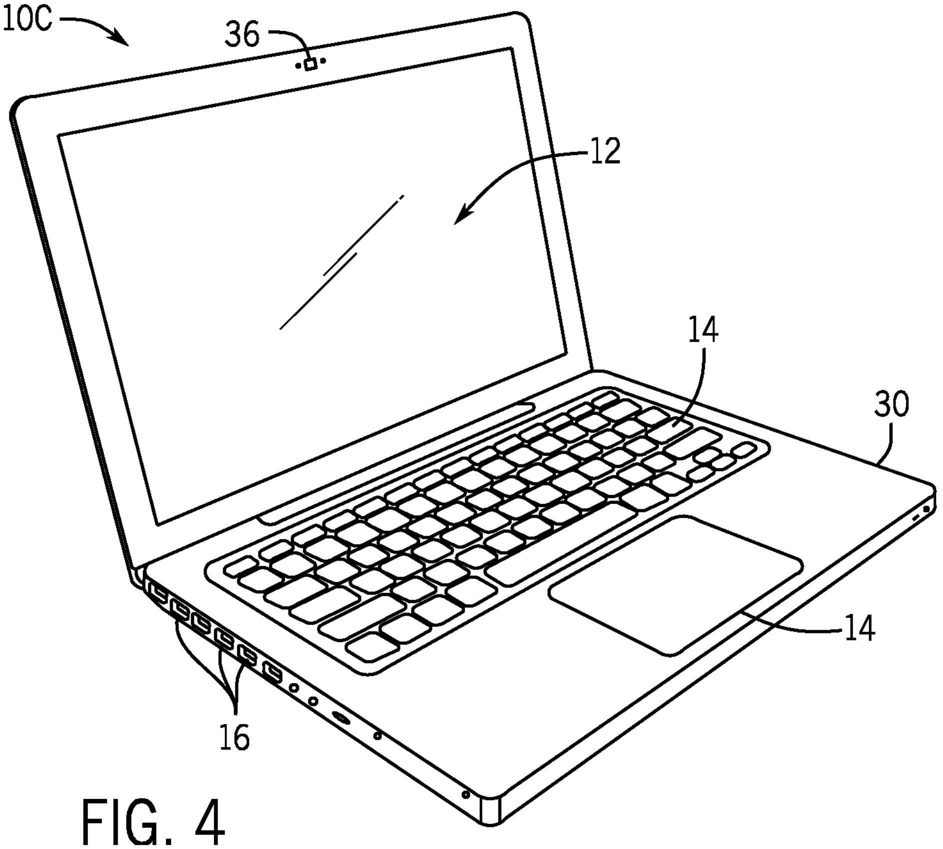
FIG. 4 is another example of the electronic device of FIG. 1 in the form of a computer, in accordance with an embodiment.
Figure 5:
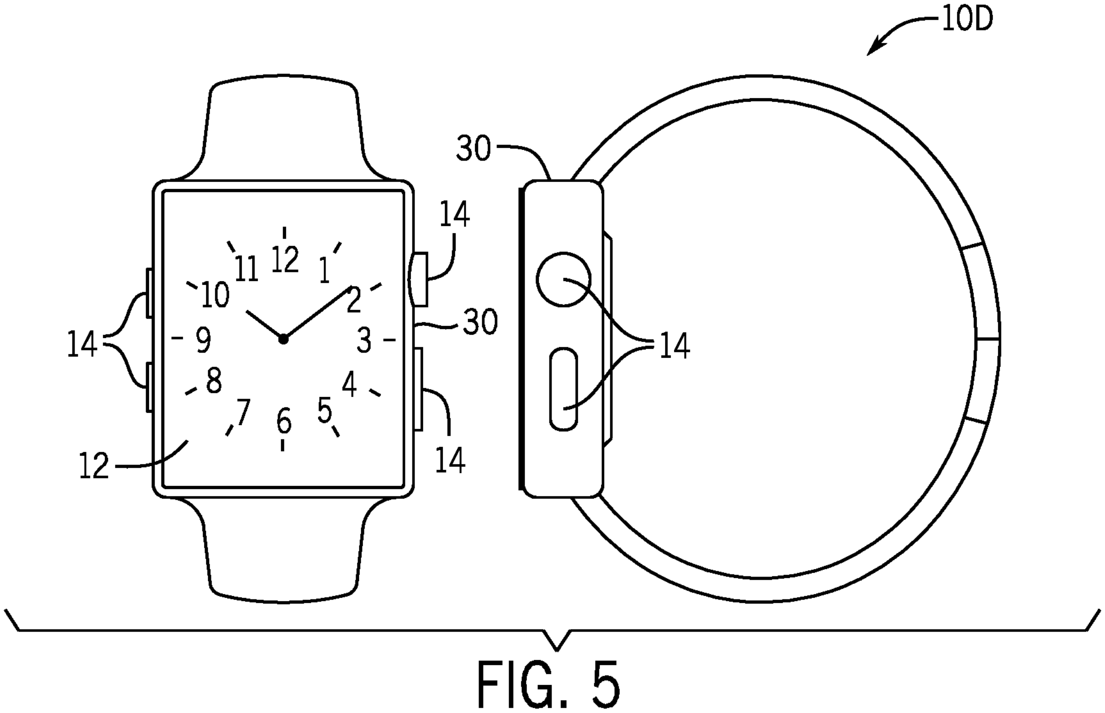
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C (e.g., notebook computer), is shown in FIG. 4. By way of example, the computer 10C may be any MACBOOK® model available from Apple Inc. Another example of a suitable electronic device 10 (e.g., a worn device), specifically a watch 10D, is shown in FIG. 5. By way of example, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
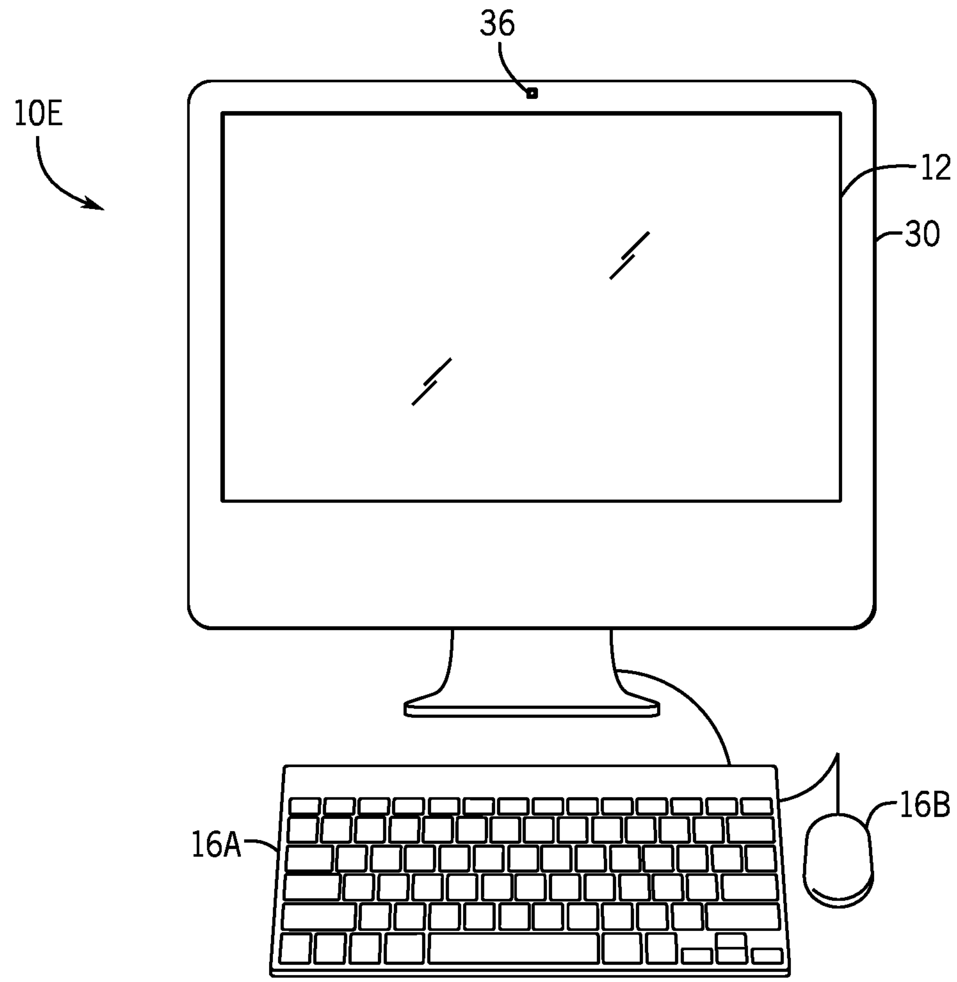
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer or a server, but may also be a standalone media player or video gaming machine. By way of example, the computer 10E may be an IMAC® or other device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As discussed above, the electronic device 10 may include one or more electronic displays 12 of any suitable type. In some embodiments, the electronic display 12 may be a micro-LED display having a display panel 40 that includes an array of micro-LEDs (e.g., red, green, and blue micro-LEDs) as display pixels. Support circuitry 42 may receive display image data 44 (e.g., digital coded image data) and send control signals 46 to an array 48 of micro-drivers 50. As should be appreciated, the display image data 44 may be of any suitable format depending on the implementation (e.g., type of display). In some embodiments, the support circuitry 42 may include a video timing controller (video TCON) and/or emission timing controller (emission TCON) that receives and uses the display image data 44 in a serial bus to determine a data clock signal and/or an emission clock signal to control the provisioning of the display image data 44 to the display panel 40. The video TCON may also pass the display image data 44 to serial-to-parallel circuitry that may deserialize the display image data 44 into several parallel image data signals. That is, the serial-to-parallel circuitry may collect the display image data 44 into the control signals 46 that are passed on to specific columns of the display panel 40. The control signals 46 (e.g., data/row scan controls, data clock signals, and/or emission clock signals) for each column of the array 48 may contain luminance values corresponding to pixels in the first column, second column, third column, fourth column . . . and so on, respectively. Moreover, the control signals 46 may be arranged into more or fewer columns depending on the number of columns that make up the display panel 40.

Figure 7:
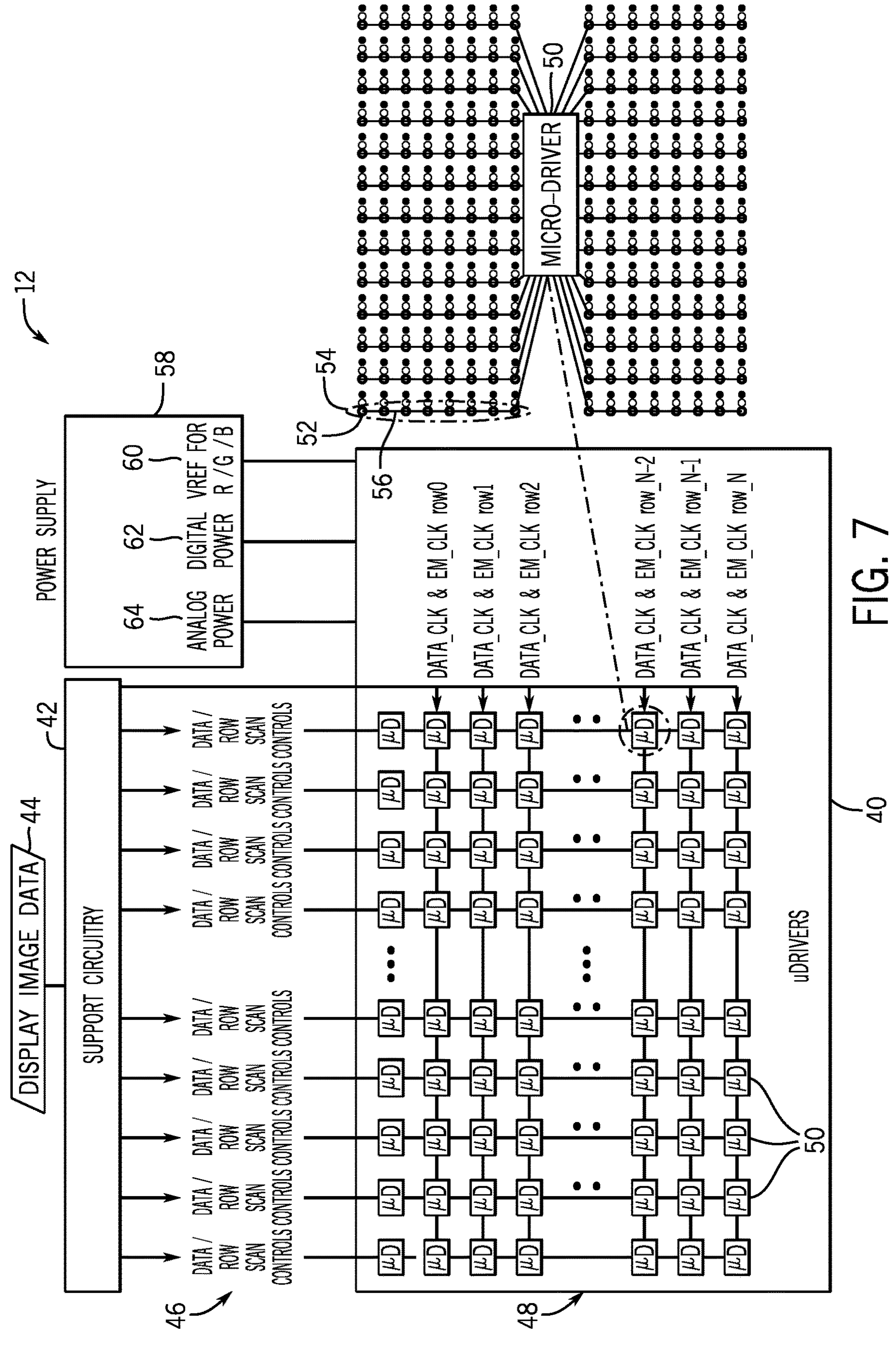
FIG. 7 is a schematic diagram of a micro-LED display that employs micro-drivers to drive display pixels with controls signals, in accordance with an embodiment.

The micro-drivers 50 may be arranged in an array 48, and each micro-driver 50 may drive a number of display pixels 52. Different display pixels 52 (e.g., display sub-pixels) may include different colored micro-LEDs (e.g., a red micro-LED, a green micro-LED, or a blue micro-LED) to emit light according to the display image data 44. Moreover, in some embodiments, the subset of display pixels 52 located at each anode 54 may be associated with a particular color (e.g., red, green, blue). Furthermore, although shown for only a single color channel, it should be appreciated that each anode 54 may have a respective cathode 56 associated with the particular color channel. For example, the depicted cathodes 56 may correspond to red color channels (e.g., subset of red display pixels 52). Indeed, there may be a second set of cathodes 56 that couple to green color channels (e.g., subset of green display pixels 52) and a third set of cathodes 56 that couple to blue color channels (subset of blue display pixels 52), but these are not expressly illustrated in FIG. 7 for ease of description.

Additionally, a power supply 58 may provide a reference voltage (VREF) 60 (e.g., to drive the micro-LEDs of the display pixels 52), a digital power signal 62, and/or an analog power signal 64. In some cases, the power supply 58 may provide more than one reference voltage 60 signal. For example, display pixels 52 of different colors may be driven using different reference voltages, and the power supply 58 may generate each reference voltage 60 (e.g., VREF for red, VREF for green, and VREF for blue display pixels 52). Additionally or alternatively, other circuitry on the display panel 40 may step a single reference voltage 60 up or down to obtain different reference voltages and drive the different colors of display pixels 52.

Figure 8:
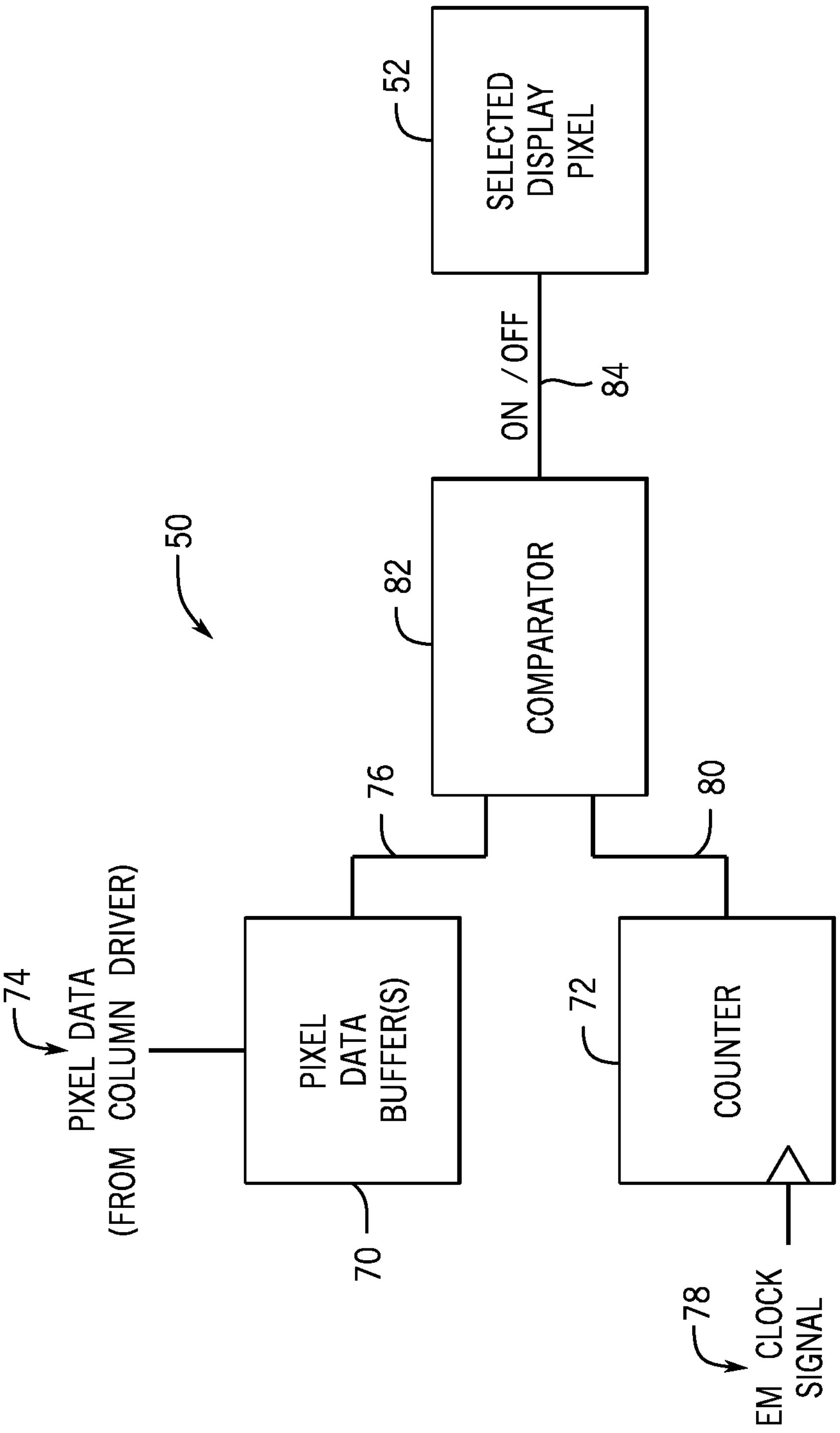
FIG. 8 is a block diagram of circuitry that may be part of a micro-driver of FIG. 7, in accordance with an embodiment.

The micro-drivers 50 may include pixel data buffer(s) 70 and/or a digital counter 72, as shown in FIG. 8. The pixel data buffer(s) 70 may include sufficient storage to hold pixel data 74 that is provided (e.g., via support circuitry 42 such as column drivers) based on the display image data 44. Moreover, the pixel data buffer(s) 70 may take any suitable logical structure based on the order that the pixel data 74 is provided. For example, the pixel data buffer(s) 70 may include a first-in-first-out (FIFO) logical structure or a last-in-first-out (LIFO) structure. Moreover, the pixel data buffer(s) 70 may output the stored pixel data 74, or a portion thereof, as a digital data signal 76 representing a desired gray level for a particular display pixel 52 that is to be driven by the micro-driver 50.

The counter 72 may receive the emission clock signal 78 and output a digital counter signal 80 indicative of the number of edges (only rising, only falling, or both rising and falling edges) of the emission clock signal 78. The digital data signal 76 and the digital counter signal 80 may enter a comparator 82 that outputs an emission control signal 84 in an "on" state when the digital counter signal 80 does not exceed the digital data signal 76, and an "off" state otherwise. The emission control signal 84 may be routed to driving circuitry (not shown) for the display pixel 52 being driven on or off. The longer the selected display pixel 52 is driven "on" by the emission control signal 84, the greater the amount of light that will be perceived by the human eye as originating from the display pixel 52.

Figure 9:
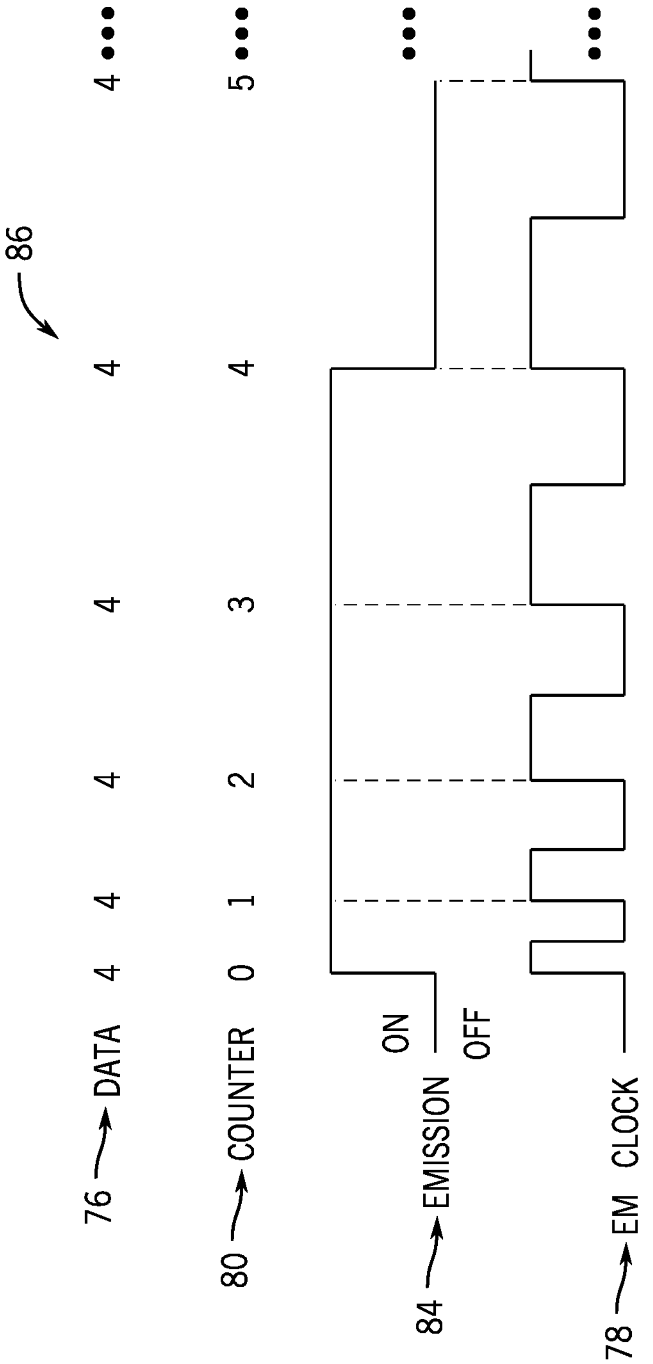
FIG. 9 is a timing diagram of an example operation of the circuitry of FIG. 8, in accordance with an embodiment.

To help illustrate, the timing diagram 86 of FIG. 9 provides an example of the operation of the micro-driver 50. The timing diagram 86 shows the digital data signal 76, the digital counter signal 80, the emission control signal 84, and the emission clock signal 78. In the example of FIG. 9, the gray level for driving the selected display pixel 52 is gray level 4, and this is reflected in the digital data signal 76. The emission control signal 84 drives the display pixel 52 to "on" for a period of time defined for gray level 4 based on the emission clock signal 78. Namely, as the emission clock signal 78 rises and falls, the digital counter signal 80 gradually increases. The comparator 82 outputs the emission control signal 84 to an "on" state as long as the digital counter signal 80 remains less than the digital data signal 76. When the digital counter signal 80 reaches the digital data signal 76, the comparator 82 outputs the emission control signal 84 with an "off" state, thereby causing the selected display pixel 52 no longer to emit light.

In some embodiments, the steps between gray levels, reflected by the steps between emission clock signal 78 edges, may be of consistent width (e.g., linearly additive) or changing width (e.g., indicative of a gamma domain). For example, based on the way humans perceive light, the difference between lower gray levels may be more perceptible than the difference between higher gray levels. The emission clock signal 78 may, therefore, increase the time between clock edges as the frame progresses. The particular pattern of the emission clock signal 78, as generated by the emission TCON, may have increasingly longer differences between edges (e.g., periods) so as to provide a gamma encoding of the gray level of the display pixel 52 being driven.

As discussed above, an electronic display 12 may display an image by pulsing light emissions from display pixels 52 such that the time averaged luminance output is equivalent to the desired luminance level of the display image data 44. Furthermore, a single image frame may be broken up into multiple (e.g., two, four, eight, sixteen, thirty-two, and so on) sub-frames, and a particular pixel may be illuminated (e.g., pulsed) or deactivated during each sub-frame such that the aggregate luminance output over the total image frame is equivalent to the desired luminance output of the particular pixel. In other words, in addition to regulating the duration of the pixel emission during a sub-frame (e.g., as discussed above with reference to FIGS. 7-9) the frequency of the pixel emissions during an image frame may be regulated to maintain an average luminance output during the image frame that appears to the human eye as the desired luminance output. For example, source image data (e.g., indicative of an image) may be processed and split into separate sets of pixel data 74 for each sub-frame. As such, the gray level discussed with respect to the digital data signal 76 may or may not correlate directly to the source image data, as the source image data is representative of the gray level for the image frame, and the digital data signal 76 is representative of the luminance output for a sub-frame. As should be appreciated, the above discussion of the operations of a micro-LED electronic display 12 is but one example of a time-multiplexed operation of an electronic display 12, and the techniques discussed herein may be applicable to other implementations of time-multiplexed electronic displays 12.

Due at least in part to the time-multiplexed nature of operating the electronic display 12 (e.g., micro-LED display), it may be difficult to ascertain the physical utilization of individual pixels until the display image data 44 is or is ready to be generated, such as after other display image processing compensations, corrections, enhancements, etc. have been performed. Indeed, as discussed herein, the display image data 44 may be a digitally coded format (e.g., non-linear gray code) indicative of desired luminance levels to be displayed. Prior to being sent to the display panel 40, the display image data 44 may be generated by converting image data (e.g., via a sub-pixel uniformity digital code conversion of the image processing circuitry 28) from a luminance or current domain to the digital code domain. In general, the image processing circuitry 28 may correct, compensate, enhance, or otherwise alter image data in a luminance domain (e.g., linear domain), gamma domain (e.g., non-linear domain), current domain, voltage domain, etc. to reduce or eliminate image artifacts and/or improve perceived image quality.

I. IR-Independent Pre-Charge for Pulsed Electronic Displays

As previously mentioned, the display pixels 52 (e.g., LEDs of the display pixels 52) may be pre-charged to an initial voltage before the display pixels 52 are provided an emission current, causing the display pixels 52 to begin to emit light as soon as the emission current is provided. Pre-charging the display pixels 52 may also refresh any charge lingering on the display pixels 52, which may increase the longevity of the display pixels 52 and combat pixel burn-in. As display panels grow larger, pre-charging display pixels 52 that are farther away from a pre-charge voltage source may result in a greater amount of IR drop at the display pixels 52 when compared to the display pixels 52 that are closer to the pre-charge voltage source. Such IR drop may result in a loss of uniformity of the display pixels due to varying levels of IR drop at different display pixels 52.

To reduce or eliminate IR drop associated with pre-charging the display pixels 52, an analog buffer and sampling capacitor may be used to provide a pre-charge voltage that is equal to the difference of two IR-independent reference voltages. This may allow the pre-charge voltage to be uniform across even a large display. Moreover, to reduce static power consumption, the analog buffer may be enabled only during particular times, such as for a pre-charge duration, and may be disabled at all other times.

Figure 10:
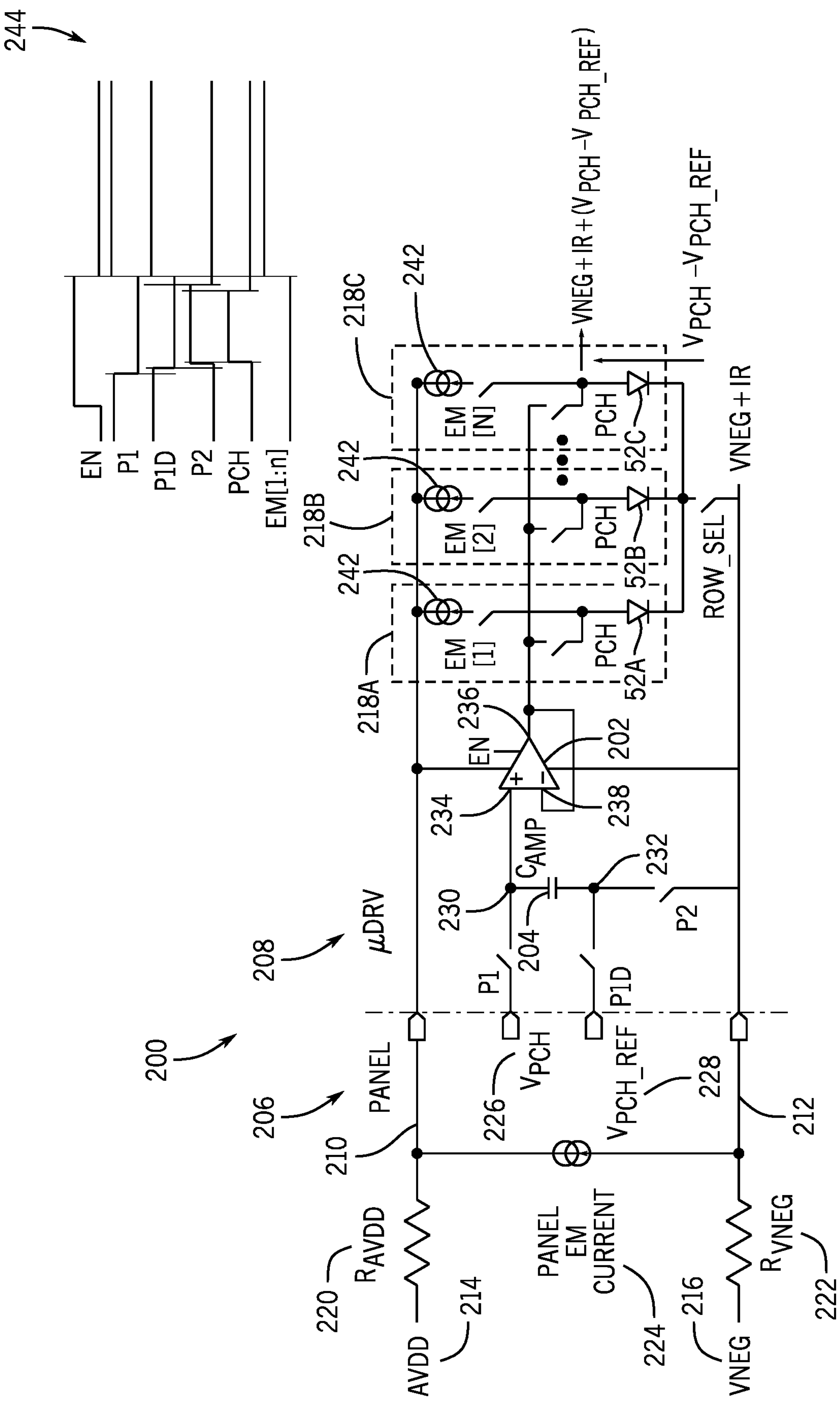
FIG. 10 is a schematic diagram of display pixel pre-charge circuitry including an analog buffer and a sampling capacitor configured to reduce or eliminate IR error associated with display pixel pre-charging, in accordance with an embodiment.

FIG. 10 is a schematic diagram of the pre-charge circuitry 200 including an analog buffer 202 and sampling capacitor 204 that may reduce or eliminate IR error associated with display pixel pre-charging, according to embodiments of the present disclosure. The pre-charge circuitry 200 includes a display panel 206 and a microdriver 208. The pre-charge circuitry 200 includes a positive power rail 210 and a negative power rail 212 that electrically couple a positive voltage source 214 and a negative voltage source 216 respectively to pixel circuitries 218A, 218B, and 218C (collectively, the pixel circuitries 218). The positive power rail 210 includes a series resistor 220 (e.g., RAVDD) and the negative power rail 212 includes a series resistor 222 (e.g., RVNEG). A panel emission (EM) current source 224 may be coupled in parallel between the positive power rail 210 and the negative power rail 212.

The pre-charge circuitry 200 includes a pre-charge voltage supply 226 and a pre-charge reference voltage supply 228 that may be provided from the edge of the display panel 206 as illustrated. The sampling capacitor 204 may be coupled between the pre-charge voltage supply 226 and the pre-charge reference voltage supply 228, such that a first terminal of the sampling capacitor 204 is coupled at a node 230 coupled to the pre-charge voltage supply 226 and a second terminal of the sampling capacitor is coupled at a node 232 coupled to the pre-charge reference voltage supply 228. A switch P1 is coupled between the pre-charge voltage supply 226 and the node 230, and a switch P1D is coupled between the pre-charge reference voltage supply 228 and the node 232. The switch P1 is configured to couple the pre-charge voltage supply 226 to the node 230 when closed and the P1D is configured to couple the pre-charge reference voltage supply 228 to the node 232 when closed. By coupling the pre-charge voltage supply 226 and the pre-charge reference voltage supply 228 to the sampling capacitor 204, the sampling capacitor 204 may store a pre-charge voltage with a value of $V_{PCH}$-$V_{PCH\_REF}$ that enables the pre-charge circuitry 200 to reduce or eliminate pre-charge IR drop across the electronic display. It should be noted that the pre-charge reference voltage may include any appropriate reference voltage, such as a reference voltage of 0 volts. Additionally, in some embodiments, the pre-charge reference voltage may be star-connected to the negative supply voltage Vneg at the power supply output or at the panel edge.

A switch P2 is coupled to the node 232 and the negative power rail 212. A row-select switch ROW SEL may couple the pixel circuitries 218 to the negative power rail 212 when closed. The pixel circuitries 218 include display pixels 52A, 52B, and 52C (collectively, the display pixels 52) which may experience some level of IR drop. For example, the display pixel 52C may experience greater IR drop than the display pixel 52A due to various factors, such as inherent resistance of conductive wires coupling the buffer 202 to the display pixels 52. When the ROW SEL switch is closed, the signal on the negative power rail 212 may include the negative voltage signal from the negative voltage supply 216 and the value of the IR drop, such that the signal on the negative power rail is VNEG+IR. It should be noted that, while IR drop is discussed, in some instances the IR error may include IR rise (e.g., an IR value greater than an expected or desired IR value, a positive voltage change).

A positive input terminal 234 of the buffer 202 is coupled to the node 230 and an output terminal 236 of the buffer 202 is coupled to a pre-charge (PCH) switch of each of the respective pixel circuitries 218A, 218B, and 218C. The PCH switch may enable the buffer 202 to pre-charge the display pixels 52 by coupling the display pixels 52 to the output of the buffer 202. A negative input terminal 238 of the buffer 202 is coupled to the output terminal 236 of the buffer 202 to form a feedback loop at the buffer 202. The buffer 202 may receive an enable (EN) signal that will cause the buffer to activate. To reduce power consumption in the pre-charge circuitry 200, the buffer 202 may be activated (e.g., the enable signal may be high) only during pre-charge periods, and the buffer 202 may be deactivated (e.g., the enable signal may be low) during all other times. It should be noted that the buffer 202 may include a unity gain buffer, which may include any appropriate type of amplifier, such as an operational amplifier.

The pixel circuitries 218 include current sources 242 and emission (EM) switches configured to couple the display pixels 52 to the current sources 242 such that the current sources 242 may provide driving current to the display pixels 52, causing the display pixels 52 to emit light based on the driving current.

The timing diagram 244 illustrates the states (e.g., on/off states) of the enable signal EN, the P1 switch, the P1D switch, the P2 switch, the PCH switches, and the EM switches. As may be observed from the timing diagram 244, the P1 and P1D switches are initially open while the P2 and PCH switches are initially closed and the EN and EM signals are initially off. That is, an initial time to, the pre-charge voltage supply 226 and the pre-charge reference voltage supply 228 are coupled to the sampling capacitor 204 and the sampling capacitor 204 is storing a charge corresponding to a value corresponding to $V_{PCH}$-$V_{PCH\_REF}$, wherein $V_{PCH}$ is the voltage signal provided by the pre-charge voltage supply 226 and $V_{PCH\_REF}$ is the voltage signal provided by the pre-charge reference voltage supply 228.

At a time t1, the EN signal is high, turning on the buffer 202, which enables the buffer 202 to output a buffered output signal equal to the pre-charge voltage signal $V_{PCH}$-$V_{PCH\_REF}$ to the pixel circuitries 218. At time t2 the P1 switch and the P1D switch open and the P2 switch and the PCH switches close. As the PCH switches are closed, the pre-charge voltage signal is provided to the display pixels 52, and the IR drop value associated with the pre-charge voltage signal is provided to the negative power rail 212, such that the power rail is carrying the VNEG+IR signal. As the P2 switch is closed, the VNEG+IR signal is provided to the positive input terminal 234 of the buffer 202, and the buffer 202 outputs to the display pixels 52 the VNEG+IR along with the pre-charge voltage signal $V_{PCH}$-$V_{PCH\_REF}$ that is stored on the sampling capacitor 204. That is, at time t2 the buffer 202 and the sampling capacitor 204 output the signal VNEG+IR+($V_{PCH}$-$V_{PCH\_REF}$) to the display pixels 52, wherein the pre-charge voltage signal is configured to offset the IR drop portion of the VNEG+IR signal, reducing or eliminating the IR drop (or IR rise) within the pixel circuitries 218.

At time t3 the EN signal turns off, the P2 switch and the PCH switches open, the P1 and P1D switches again close, and the EM switches close to provide drive currents to the display pixels 52 now that the correct pre-charge voltage and IR drop offsets have been applied to the display pixels 52. In this manner, the pre-charge circuitry 200 may enable display pixels 52 pre-charging while reducing or eliminating pre-charge voltage-based IR drop across the display pixels 52.

II. Digital IR Drop Reduction in Pulsed Electronic Displays Using Alternating Inverters As previously mentioned, in some instances, non-inverting buffers may be implemented in a microdriver circuit. However, using inverters or inverting buffers to transmit data from microdriver-to-microdriver rather than using non-inverting buffers inverts the data input signal (e.g., data voltage), enabling the microdrivers to distribute IR drop across positive and negative voltages of the microdriver circuit. For example, adjacent microdrivers may use alternating inverters to distribute IR drop between positive voltages (e.g., VDD) and negative voltages (e.g., VSS). The display 12 has numerous data lines starting from the panel edge and reaching to the bottom of the display panel. The data is loaded into the display pixels from the panel edge to the bottom of the display panel. As panel size grows, the number of data lines has to be increased proportionally with the size of the panel. The data lines may toggle simultaneously, meaning that all data lines are active at one time and all are inactive at a subsequent time. When the data lines are all active, it may generate a large peak current. By toggling the polarity of data input signals, a subset of the total number of data lines may be active, while another subset of the total number of data lines may be inactive, lowering the peak current drawn by the display 12.

Figure 11:
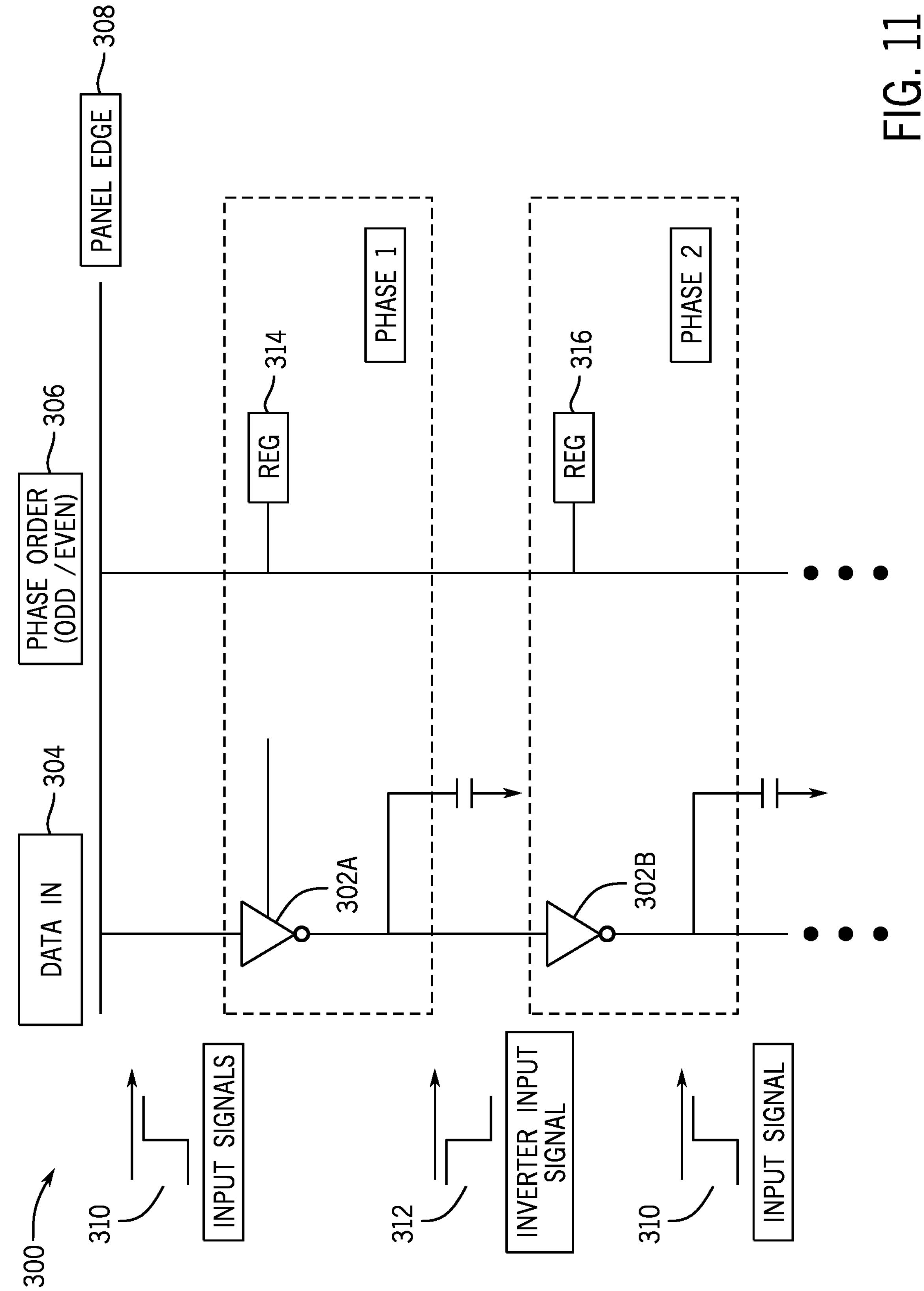
FIG. 11 is a schematic diagram of a microdriver circuit implemented using inverters to reduce overall IR error experienced by the microdriver circuit, in accordance with an embodiment.

FIG. 11 is a schematic diagram of a microdriver circuit 300 implemented using inverters 302A and 302B (collectively, the inverters 302) to reduce overall IR error experienced by the microdriver circuit 300, according to embodiments of the present disclosure. The microdriver circuit may include a data input line 304 coupled to the inverters 302 and a phase order signal generator 306 disposed along a panel edge 308. The inverters 302 may swap the polarity of an input signal, such that the polarity of the input signal is non-inverted and inverted for alternating phases. That is, a non-inverted data signal 310 may be provided to odd-numbered phases and inverted data signals 312 may be provided to even-numbered phases, or vice versa. The phase order signal generator 306 may generate a phase order signal that may include a digital signal stored in registers 314 and 316 to track the phase order associated with image data. For example, the register 314 may interpret a 0 as a 1 and a 1 as a 0 to indicate the inversion of the signal, while the register 316 may interpret a 0 as a 0 and a 1 as a 1 to indicate non-inversion of the signal. In some embodiments, a microdriver pin may be used to configure polarity of the input signal.

As the data input signals (e.g., 310 and 312) from the panel edge 308, there is a degree of IR drop associated with the distance the data input signal travels to the display pixels 52 such that the IR drop increases proportionally with distance. The IR drop that is experienced at the opposite panel edge (e.g., the bottom edge furthest away from the panel edge 308) may prohibit the microdriver circuit 300 from closing the timing. This may decrease the data speed at which the data input signal is broadcast, limiting performance of the electronic display 12, as the data input signal must be received by the display pixels 52 before the display pixels 52 can emit.

By implementing one or more of the inverters 302 into a series of microdrivers (e.g., implementing the inverters into the microdriver circuit 300) and inverting the polarity of the data input signals 310 and 312 at given intervals, the IR error (e.g., IR drop or IR rise) may be distributed across positive voltage supply (e.g., VDD) and negative voltage supply (e.g., VSS). For example, the input signal 310 may be cause an IR drop on the positive voltage supply for phase 1. As the input signal 310 enters the inverter 302A, the polarity of the signal may be swapped, and the inverted input signal 312 may be provided to a subsequent microdriver for phase 2. Due to the inverted input signal 312, the microdriver circuit 300 may experience an IR rise on the negative voltage supply for phase 2. As the inverted input signal 312 enters the inverter 302B, the polarity of the signal may again be swapped, and the input signal 310 may be outputted from the inverter 302B.

By reducing the IR error across the microdriver circuit 300, the peak panel current of the display 12 may also be limited. This is so because the display panel has numerous data lines starting from the panel edge 308 and reaching to the bottom of the display panel. The data is loaded into the microdrivers from the panel edge 308 to the bottom of the display panel. As panel size grows, the number and/or length of data lines may increase proportionally with the size of the panel. The data lines may toggle simultaneously, meaning that all data lines are active at one time and all are inactive at a subsequent time. When the data lines are all active, it may generate a large peak current. By toggling the polarity of the input signals (e.g., 310 and 312), a subset of the total number of data lines may be active, while another one or more subsets of the total number of data lines may be inactive. For example, on the rising edge of the odd rows, the data lines may be discharged, and therefore may only conduct VSS current. On the rising edge of the even rows, the data lines may be charged, and therefore may only conduct VDD current. Because only a portion of the total number of data lines will be simultaneously active, rather than all of the data lines being simultaneously active, toggling the polarity of the input signals may lower the peak current drawn by the display 12.

Figure 12:
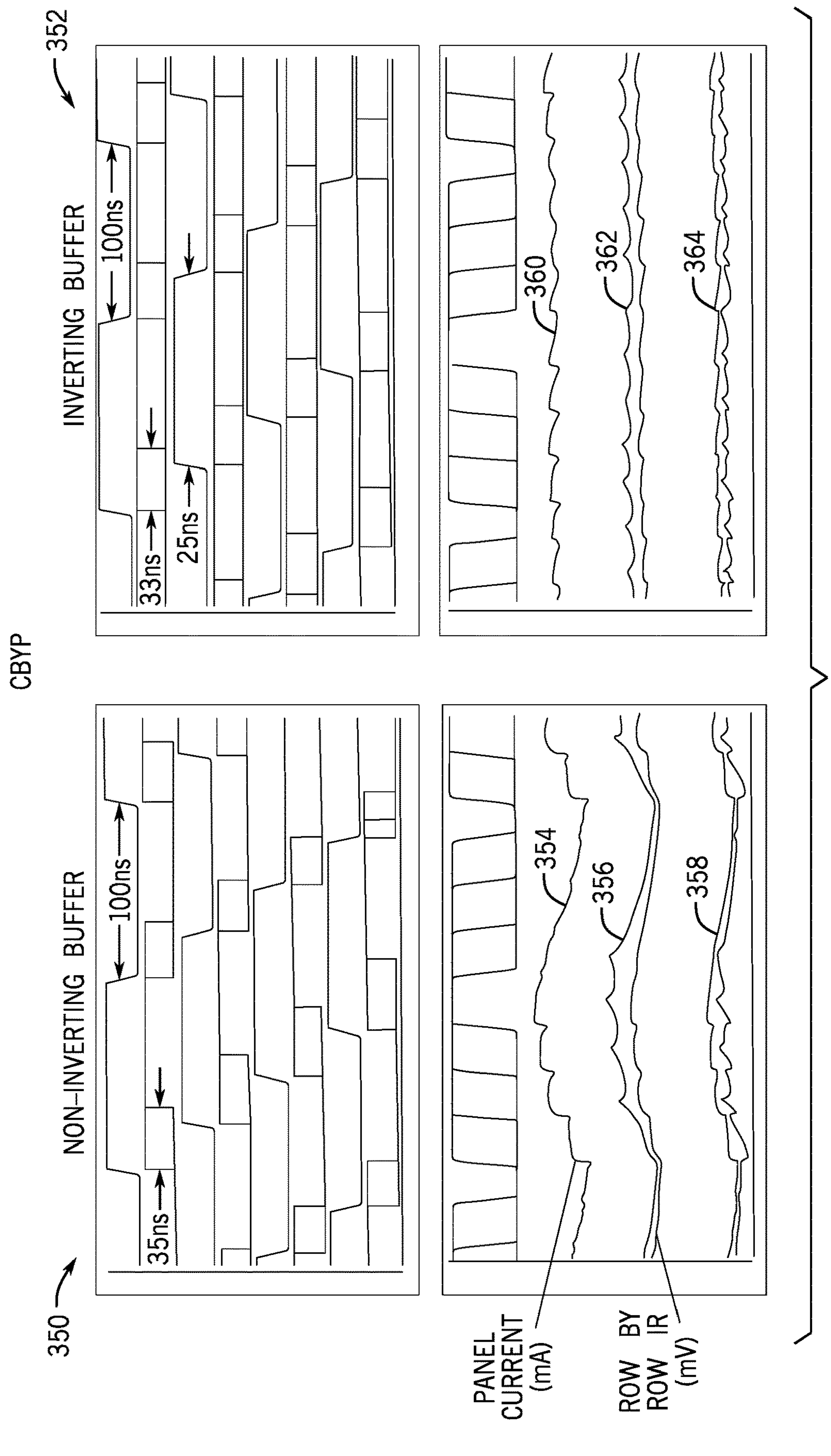
FIG. 12 is a diagram illustrating phase, peak panel current, and IR error for an electronic display implemented with non-inverting buffers and a diagram illustrating phase, peak panel current, and IR error for an electronic display implemented with inverters or inverting buffers, in accordance with an embodiment.

FIG. 12 includes a diagram 350 illustrating phase, peak panel current, and IR error for an electronic display implemented with non-inverting buffers and includes a diagram 352 illustrating phase, peak panel current, and IR error for an electronic display implemented with inverters, according to embodiments of the present disclosure. The diagram 350 illustrates non-inverting buffer panel current 354, the non-inverting row-by-row IR error 356 (e.g., IR drop or IR rise), the off-panel IR error 358. The diagram 352 illustrates the inverting buffer panel current 360, the inverting buffer row-by-row IR error 362, and the inverting buffer off-panel IR error 364. As may be observed from the diagrams 350 and 352, the peak current, the peak row-by-row IR error, and the peak off-panel IR error for electronic displays implementing non-inverting buffers may be much greater than the peak current, peak row-by-row IR error, and the peak off-panel IR error for electronic display implementing inverting buffers to toggle the polarity of input data signals.

Accordingly, it may be appreciated that the microdriver circuit 300 discussed with respect to FIG. 11 may reduce overall IR drop experienced by the microdriver circuit 300 by implementing the inverters 302 that may enable distributing IR drop between positive voltage and negative voltage. Moreover, when one of the voltage sources has lower IR drop, this may improve overall headroom for the microdriver circuit 300. Further, because toggling between polarities results in a small staggering of the peak panel current and the IR error, which may also distribute IR drop over time, further reducing the instantaneous IR drop across the display 12.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic display, comprising:
- an electronic display panel comprising:
  - a plurality of display pixels configured to emit light;
  - a first pre-charge voltage source; and
  - a second pre-charge voltage source; and
  - a microdriver, comprising:
  - a capacitor coupled at a first terminal to the first pre-charge voltage source and coupled at a second terminal to the second pre-charge voltage source; and
  - a buffer, comprising:
    - a positive input terminal coupled to the first pre-charge voltage source and the capacitor;
    - an output terminal coupled to a plurality of pixel circuitries each having an associated pre-charge switch; and
    - a negative input terminal coupled to the output terminal;
    - wherein the output terminal of the buffer is coupled to a pre-charge switch of each of the respective pixel circuitries to enable the buffer to pre-charge the pixel circuitries during pre-charge periods of the pixel circuitries.

2. The electronic display of claim 1, wherein the second pre-charge voltage source is configured to provide a reference voltage.

3. The electronic display of claim 2, wherein the reference voltage comprises a value of 0 volts.

4. The electronic display of claim 2, wherein the second pre-charge voltage source is coupled in star-configuration to a negative power rail at a power supply output or is coupled in star-configuration at an edge of the electronic display panel.

5. The electronic display of claim 1, wherein the buffer is configured to output a buffered pre-charge voltage to the plurality of pixel circuitries, wherein the buffered pre-charge voltage comprises a difference between a first pre-charge voltage of the first pre-charge voltage source and a pre-charge reference voltage of the second pre-charge voltage source.

6. The electronic display of claim 5, wherein the buffered pre-charge voltage is configured to mitigate a voltage error across the plurality of pixel circuitries.

7. The electronic display of claim 1, wherein the capacitor is configured to couple to a power rail via the second terminal of the capacitor, wherein coupling to the power rail couples the capacitor to a negative voltage supply.

8. The electronic display of claim 7, wherein a row select switch is configured to couple one or more of the plurality of pixel circuitries to the power rail.

9. The electronic display of claim 8, wherein coupling the one or more of the plurality of pixel circuitries to the power rail is configured to sum a voltage signal of the negative voltage supply and a voltage value associated with a voltage error.

10. The electronic display of claim 9, wherein the voltage error comprises a voltage drop.

11. The electronic display of claim 9, wherein the voltage error comprises a voltage rise.

12. The electronic display of claim 9, wherein the buffer is configured to output a value equal to the sum of the voltage signal of the negative voltage supply and the voltage value associated with the voltage error and a sum of a difference between a first pre-charge voltage of the first pre-charge voltage source and a pre-charge reference voltage of the second pre-charge voltage source.

13. A microdriver for a pulsed electronic display, the microdriver comprising:
- a capacitor coupled at a first terminal to a first pre-charge voltage source and coupled at a second terminal to a second pre-charge voltage source; and
- a buffer, comprising:
  - a positive input terminal coupled to the first pre-charge voltage source and the capacitor;
  - an output terminal coupled to a plurality of pixel circuitries each having an associated pre-charge switch; and
  - a negative input terminal coupled to the output terminal;
- wherein the output terminal of the buffer is coupled to a pre-charge switch of each of the respective pixel circuitries to enable the buffer to pre-charge the pixel circuitries during pre-charge periods of the pixel circuitries.

14. An electronic device, comprising:
- a processor configured to generate image data; and
- an electronic display, comprising:
  - an electronic display panel comprising:
    - a plurality of display pixels configured to emit light based on the image data;
    - a first pre-charge voltage source; and
    - a second pre-charge voltage source; and
  - a microdriver, comprising:

a capacitor coupled at a first terminal to the first pre-charge voltage source and coupled at a second terminal to the second pre-charge voltage source; and a buffer, comprising:

a positive input terminal coupled to the first pre-charge voltage source and the capacitor;

an output terminal coupled to a plurality of pixel circuitries each having an associated pre-charge switch; and a negative input terminal coupled to the output terminal;

wherein the output terminal of the buffer is coupled to a pre-charge switch of each of the respective pixel circuitries to enable the buffer to pre-charge the pixel circuitries during pre-charge periods of the pixel circuitries.

15. The electronic device of claim 14, comprising a plurality of registers or a microdriver pin, wherein each register of the plurality of registers is configured to store a signal indicating a phase order associated with the image data.

16. The microdriver of claim 13, wherein the buffer is configured to output a buffered pre-charge voltage to the plurality of pixel circuitries, wherein the buffered pre-charge voltage comprises a difference between a first pre-charge voltage of the first pre-charge voltage source and a pre-charge reference voltage of the second pre-charge voltage source.

17. The microdriver of claim 13, wherein the capacitor is configured to couple to a power rail via the second terminal of the capacitor, wherein coupling to the power rail couples the capacitor to a negative voltage supply.

18. The microdriver of claim 17, wherein a row select switch is configured to couple one or more of the plurality of pixel circuitries to the power rail.

19. The electronic device of claim 14, wherein the capacitor is configured to couple to a power rail via the second terminal of the capacitor, wherein coupling to the power rail couples the capacitor to a negative voltage supply, wherein a row select switch is configured to couple one or more of the plurality of pixel circuitries to the power rail, and wherein coupling the one or more of the plurality of pixel circuitries to the power rail is configured to sum a voltage signal of the negative voltage supply and a voltage value associated with a voltage error.

20. The electronic device of claim 19, wherein the buffer is configured to output a value equal to the sum of the voltage signal of the negative voltage supply and the voltage value associated with the voltage error and a sum of a difference between a first pre-charge voltage of the first pre-charge voltage source and a pre-charge reference voltage of the second pre-charge voltage source.

* * * * *